3,836,682
METHOD FOR ENHANCING SOLUBLE
FOODSTUFFS
Slawko Yadlowsky, Manville, N.J., assignor to General
Foods Corporation, White Plains, N.Y.
No Drawing. Filed May 12, 1972, Ser. No. 252,779
Int. Cl. A23f 1/04
U.S. Cl. 426—312
9 Claims

ABSTRACT OF THE DISCLOSURE

A process for producing an enhanced soluble foodstuff which will exhibit a pleasant aroma when dissolved in water has been developed. Aromas such as coffee aroma are fixed in a liquid glyceride-carbohydrate solids medium which is then solidified, subdivided, blended with a liquid extract and dried. The fixed aroma may be frozen in order to facilitate subdivision. According to a preferred embodiment of this invention coffee aroma is added to a vegetable oil having suspended therein particles of soluble coffee.

BACKGROUND OF THE INVENTION

Soluble food powders such as soluble coffee are normally deficient in the aromas found in the fresh foodstuffs, due to loss of volatile aromatics during the production of the soluble powder, especially during the drying operation. With respect to soluble coffee there have been previous attempts to produce an enhanced product by adding aroma condensates directly to coffee extract and then drying. Such techniques are disclosed in U.S. Pat. Nos. 2,562,206 to Nutting, 3,132,947 to Mahlmann and 3,244,-531 to Clinton et al. as methods to obtain a soluble coffee powder which will produce a beverage having the flavor and/or aroma of freshly brewed coffee. These patents while producing products which are directionally better than conventional unenhanced soluble coffee have not been commercially employed to produce significantly improved soluble coffee products. Thus the producers of soluble food powders, particularly the soluble coffee makers, are still looking for ways to make their reconstituted soluble products more closely resemble the respective freshly prepared liquids such as fresh brewed coffee.

Summary of the Invention

By means of this invention it has been found that soluble food powders, such as soluble coffee, can be produced which exhibit an aroma and/or flavor in the reconstituted liquid similar to their freshly prepared counterparts, such as fresh brewed coffee. According to this invention, natural and/or synthetic volatile compounds are combined with a liquid-solid fixative medium compound of a liquid glyceride (e.g. vegetable oil) and water-soluble and/or water-dispersible carbohydrate solids (e.g. soluble coffee). Upon completion of aroma addition, the solids-glyceride suspension is solidified, such as by freezing, and comminuted or subdivided, such as by grinding, added to a liquid extract and dried.

It is advantageous that the liquid extract be chilled in order to preserve the glyceride containing particles in a congealed or frozen condition and it is preferred that the liquid extract be in the slush state (i.e. a mixture of ice crystals and concentrated liquid extract) in order to facilitate uniform blending of the solidified glyceride particles into the extract. The enhanced extract may be dried in any conventional manner such as by spray drying or freeze drying, it being recognized that freeze drying will generally minimize loss of volatiles.

It has additionally been found that it is possible to remove free glyceride from the enhanced glyceride suspension such as by decanting or draining thereby producing a relatively solid mass which it may be necessary to freeze in order to subdivide. The solid mass may then be merely added in discrete portions to the chilled or slushed extract where it tends to further solidify as a result of the reduced temperature of the extract.

It is preferred from the standpoint of fixing the maximum amount of volatiles in the glyceride-solids suspension, to add the volatiles to the already prepared suspension as opposed to adding the volatiles to the glyceride with the subsequent addition of the carbohydrate solids. In this manner it is thought that the various volatiles present in the aroma will be preferentially absorbed by either the glyceride or the solid particles, and that the total amount of volatile fixation will be greater and more stable than using the liquid glyceride alone.

Description of the Invention

Description of the Invention

The volatiles which are to be fixed in the glyceride-solids suspension may be in any state which permits the addition of the volatile compounds to the carrier. For volatiles like coffee aromas, generally the aromas will be condensed to a liquid or frost state and then blended with the carrier; although, it will also be possible to obtain some fixation by merely bubbling the gaseous aroma through the fixing medium.

Coffee aromas such as grinder gas, steam-distilled aromas and vacuum-distilled aromas and condensates are useful in the method of this invention. This invention will, however, be particularly described in terms of grinder gas which has been collected by subdividing freshly roasted coffee, such as by grinding, in hooded Gump grinders. The grinder gas is preferably condensed to a frost by means of liquid nitrogen.

The medium used in this invention to fix the volatiles is comprised of both a fluid and a solid phase. The fluid phase is a glyceride material such as triacetin, liquid fats or oils, including coffee oil and the bland-tasting vegetable oils such as cottonseed oil. The solid phase is comprised of water-soluble or water-dispersible carbohydrate solids such as coffee solids, dextrins, gum arabic and the like.

Glycerides have been found to be useful as aroma fixatives for soluble coffee because they are thought to assist in both retaining the volatile compounds in the product and keeping the volatile compounds from degrading by protecting the volatiles from oxygen and water and also by minimizing interactions between the volatiles themselves. It has now been found that by suspending carbohydrate solids in the glyceride liquid improved fixation can be achieved. Addition of even a small amount of the suspended solids has proven to be beneficial; however, normally the solids are added to the glyceride in the amount of at least 10% by weight of the glyceride component and may be readily used up to the point the solids are no longer easily dispersed in the glyceride, usually about 40%. Generally the ratio of solids to glyceride of about 1:4 has been found to be preferred for producing a fixing medium having both a manageable viscosity and sufficient solids content to significantly improve fixation.

The solid particles suspended in the glyceride must be water-soluble or water-dispersible in order to remain undetected in the reconstituted liquid and these particles should not impart any noticeable taste to the reconstituted liquid. For aromatizing soluble coffee products it has been found useful to employ soluble coffee solids as the particles suspended in the glyceride. Spray dried coffee particles having a size of about 100 to 500 microns have proven suitable for this invention; however, finely ground freeze dried coffee powder may also be used. As previously indicated it is preferable to suspend the particles in the glyceride prior to addition of the volatile compounds. In this manner fixation of volatiles is maximized.

Upon completion of aroma addition, the solids in glyceride suspension is added to a liquid extract such as coffee extract. The suspension is added in such a way that discrete particles of the suspension are present in the extract. Preferably this is accomplished by cooling the suspension to a point where it becomes relatively solid and is capable of being subdivided. It is possible to obtain a somewhat solid mass without chilling, by removing some of the liquid glyceride from the suspension such as by filtering or decanting means; however, this is not always advantageous since the glyceride will contain some of the volatile compounds.

It has been found that the suspensions of this invention solidify on cooling more readily than does the aromatized glyceride without added solids. Usually it will be preferred to cool the suspension to the point where it becomes solid enough to be ground in conventional grinding equipment; however, it is recognized that other means of subdividing the solid suspension, such as by cutting, may be employed.

The subdivided suspension is preferably added to and blended with a chilled extract in order to eliminate or minimize melting of the solid suspension. The use of a slushed extract is additionally preferred since the presence of ice crystals aids in uniformly distributing the subdivided suspension in the extract. The ice crystals apparently tend to keep the subdivided particles from agglomerating or from all rising to the surface of the extract.

The enhanced extract is finally dried to produce an enhanced soluble powder, which upon contact with water, usually hot water, dissolves and exhibits a pleasant aroma and/or taste. Drying may take place by any of the known drying procedures such as by completely freezing, grinding and then vacuum freeze drying the enhanced extract, or by concentrating and then spray drying the enhanced extract.

This invention is further illustrated but not limited by the following example.

Example

Cottonseed oil and spray dried soluble coffee solids having particle sizes between about 100 and 300 microns are blended into a uniform suspension in a vessel with manual stirring at a weight ratio of solids to oil of 1 to 4. To 50 ml. of this suspension is blended 50 grams of grinder gas condensate collected by condensing with liquid nitrogen the gases liberated from grinding freshly roasted coffee in hooded Gump grinders. This aromatized suspension is placed in a pan and frozen by contacting the pan with liquid nitrogen. The frozen mass is then ground by pressing it through an 80 U.S. mesh screen. The frozen particles are then mixed with slushed coffee extract (25% solids and 27° F.) at a level of about 2% by weight of the extract solids and the enhanced extract is then promptly completely frozen to below −20° F., ground and vacuum freeze dried according to conventional drying techniques.

Coffee beverages conventionally prepared by adding hot water to the soluble freeze dried powder produced according to the above procedure was found to produce a cup aroma which is much preferred over beverages prepared from unenhanced freeze dried coffee and which is characterized as resembling the aroma from freshly brewed coffee beverages.

Having thus described the invention what is claimed is:

1. A method for producing an enhanced soluble foodstuff comprising the steps of:
   (a) forming a glyceride-solids suspension comprised of a liquid glyceride and soluble coffee solids in the amount of at least 10% by weight of the glyceride,
   (b) adding a volatile enhancer to the glyceride-solids suspension,
   (c) solidifying the enhanced suspension by freezing,
   (d) subdividing the solidified suspension,
   (e) blending the subdivided particles with a slushed liquid extract, and then
   (f) freezing and freeze drying the enhanced extract.

2. The method of claim 1 wherein the volatile enhancer comprises a condensed aroma.

3. The method of claim 1 wherein the liquid glyceride comprises a vegetable oil.

4. The method of claim 1 wherein the solidified suspension is subdivided by grinding.

5. The method of claim 1 wherein the weight ratio of solids to glyceride in the suspension is about 1:4.

6. The method of claim 1 wherein the volatile enhancer comprises a condensed coffee aroma and the slushed extract is coffee extract.

7. The method of claim 6 wherein the liquid glyceride comprises a vegetable oil.

8. The method of claim 7 wherein the weight ratio of coffee solids to vegetable oil in the suspension is about 1:4.

9. The method of claim 7 wherein the condensed coffee aroma is condensed grinder gas.

References Cited

UNITED STATES PATENTS

| | | | |
|---|---|---|---|
| 3,244,533 | 4/1966 | Clinton et al. | 99—71 |
| 3,261,689 | 7/1966 | Ponzoni | 99—71 |
| 3,554,761 | 1/1971 | Carbonell | 99—71 |
| 2,947,634 | 8/1960 | Feldman et al. | 99—71 |
| 3,373,042 | 3/1968 | Elerath et al. | 99—71 |
| 3,406,074 | 10/1968 | Klein et al. | 99—71 |
| 3,472,835 | 10/1969 | Buckler et al. | 426—387 X |

OTHER REFERENCES

Sivetz: Coffee Processing Technology, vol. II, 1963, p. 53.

FRANK W. LUTTER, Primary Examiner

N. F. GREENBLUM, Assistant Examiner

U.S. Cl. X.R.

426—362, 386